US 008654261 B2

(12) United States Patent (10) Patent No.: US 8,654,261 B2
Kurokawa (45) Date of Patent: Feb. 18, 2014

(54) VIDEO AND AUDIO PROCESSING DEVICE AND PROGRAM THEREOF

(75) Inventor: Kazuya Kurokawa, Neyagawa (JP)

(73) Assignee: Onkyo Corporation, Neyagawa-shi (JP)

( * ) Notice: Subject to any disclaimer, the term of this patent is extended or adjusted under 35 U.S.C. 154(b) by 832 days.

(21) Appl. No.: 12/702,419

(22) Filed: Feb. 9, 2010

(65) Prior Publication Data

US 2010/0321585 A1 Dec. 23, 2010

(30) Foreign Application Priority Data

Jun. 22, 2009 (JP) ................................. 2009-147469

(51) Int. Cl.
*H04N 5/268* (2006.01)
(52) U.S. Cl.
USPC ........... 348/705; 348/706; 348/725; 348/729; 348/730; 348/732; 348/735; 348/731; 348/553; 348/569; 725/38; 725/59
(58) Field of Classification Search
USPC ......... 348/705, 732, 725, 706, 729, 730, 735, 348/731, 553, 569; 725/38, 59
See application file for complete search history.

(56) References Cited

U.S. PATENT DOCUMENTS

| 5,621,482 | A  | * | 4/1997  | Gardner et al. ................ 348/725 |
| 5,748,255 | A  | * | 5/1998  | Johnson et al. ............... 348/553 |
| 6,118,496 | A  | * | 9/2000  | Ho ................................. 348/706 |
| 6,151,077 | A  | * | 11/2000 | Vogel et al. ................... 348/553 |
| 6,924,848 | B2 | * | 8/2005  | Onomatsu ..................... 348/732 |
| 8,037,412 | B2 | * | 10/2011 | Nathan et al. ................. 715/716 |
| 8,154,665 | B2 | * | 4/2012  | Miyagawa ..................... 348/732 |
| 8,184,508 | B2 | * | 5/2012  | Nathan et al. ............. 369/30.06 |
| 2002/0089603 | A1 | * | 7/2002  | Onomatsu ..................... 348/554 |
| 2002/0101541 | A1 | * | 8/2002  | Takagi et al. ................. 348/569 |
| 2004/0105031 | A1 | * | 6/2004  | Shibusawa .................... 348/570 |
| 2004/0250292 | A1 | * | 12/2004 | Okamoto et al. ............. 725/131 |
| 2006/0001554 | A1 |   | 1/2006  | Morishita |
| 2006/0001776 | A1 |   | 1/2006  | Araki |
| 2006/0020997 | A1 | * | 1/2006  | Onomatsu et al. ............ 725/134 |
| 2006/0256241 | A1 |   | 11/2006 | Suzuki et al. |
| 2007/0177061 | A1 | * | 8/2007  | Miyazaki ...................... 348/725 |
| 2007/0242166 | A1 | * | 10/2007 | Miyagawa .................... 348/732 |

FOREIGN PATENT DOCUMENTS

| JP | 2006-019890 | 1/2006 |
| JP | 2006-019947 | 1/2006 |
| JP | 2006-108750 | 4/2006 |
| JP | 2008-299938 | 12/2008 |
| JP | 2009-100329 | 5/2009 |
| WO | 2005/015901 | 2/2005 |
| WO | 2006/025441 | 3/2006 |

* cited by examiner

*Primary Examiner* — Jefferey Harold
*Assistant Examiner* — Mustafizur Rahman
(74) *Attorney, Agent, or Firm* — Renner, Otto, Boisselle & Sklar, LLP

(57) ABSTRACT

A video and audio processing device comprises: a switching unit that switches a video input and output pathway at least between "analog video input terminal—analog video output terminal" and "specific-standard digital input terminal—specific-standard digital output terminal"; an input determining unit that determines whether the specific-standard digital data is fed into the specific-standard digital input terminal; and a pathway determining unit that determines whether the video input and output pathway is "analog video input terminal—analog video output terminal". The receiving unit produces only the audio data from the specific-standard digital data, when the specific-standard digital data is fed into the specific-standard digital input terminal while the video input and output pathway is "analog video input terminal—analog video output terminal".

8 Claims, 12 Drawing Sheets

VIDEO AND AUDIO PROCESSING DEVICE AND PROGRAM THEREOF

BACKGROUND OF THE INVENTION

1. Field of the Invention

The present invention relates to a video and audio processing device including a specific-standard digital input terminal, an analog video input terminal, a specific-standard digital output terminal, and an analog video output terminal.

2. Description of the Related Art

An AV amplifier includes an HDMI output terminal and an analog video output terminal (component, S-video, CVBS, or the like) as a video output terminal. However, the AV amplifier can output video data from only either the HDMI output terminal or the analog video output terminal through an image processing unit (hereinafter referred to as VSP). Therefore, it is necessary that a video output destination be set to one of the HDMI output terminal and the analog video output terminal by a user manipulation. When the setting is mistakenly performed, the video cannot be output to a display device through the VSP. For example, while the display devices are connected to the HDMI output terminal and the analog video output terminal, the display device connected to the HDMI output terminal is put into a power-off state, and the display device connected to the analog video output terminal is put into a power-on state to display the video on the display device. In such cases, it is necessary that the video output destination be set to the analog video output terminal by the user manipulation.

In order to solve the problem, it is considered that the video output destination is automatically set. For example, a hot plug signal is detected from the display device connected to the HDMI output terminal, the video output destination is set to the HDMI output terminal when the hot plug signal is at a high level, and the video output destination is set to the analog video output terminal when the hot plug signal is at a low level.

In this case, HDMI is specific-standard digital data including video data and audio data. The AV amplifier is permitted to output the HDMI data only to a device in which HDCP authentication is successfully performed. When the video output destination is set to the analog video output terminal, the AV amplifier does not successfully perform the HDCP authentication of the display device connected to the analog video output terminal. Accordingly, the AV amplifier cannot set the video input source to the HDMI input terminal. That is, the AV amplifier sets the video input source to the analog video input terminal, and the AV amplifier outputs the video signal, fed from the analog video input terminal, from the analog video output terminal. Therefore, the AV amplifier also sets the audio input source to the analog audio input terminal or the digital audio input terminal, and the AV amplifier amplifies the audio signal, fed from the analog audio input terminal or the digital audio input terminal, to output the amplified audio signal to a speaker. As a result, the AV amplifier cannot amplify the audio data, included in the HDMI data, to output the audio data to the speaker.

SUMMARY OF THE INVENTION

An object of the present invention is to provide a video and audio processing device that can produce audio data from specific-standard digital data to output the audio data even if a video output destination is set to an analog video output terminal and a program thereof.

According to a preferred embodiment of the present invention, a video and audio processing device comprises: at least one specific-standard digital input terminal into which specific-standard digital data including video data and audio data is fed; at least one analog video input terminal into which an analog video signal is fed; at least one specific-standard digital output terminal from which the specific-standard digital data is output; at least one analog video output terminal from which the analog video signal is output; a receiving unit that receives the specific-standard digital data fed into the specific-standard digital input terminal and produces video data and/or audio data from the specific-standard digital data; a switching unit that switches a video input and output pathway at least between "analog video input terminal—analog video output terminal" and "specific-standard digital input terminal—specific-standard digital output terminal"; an input determining unit that determines whether the specific-standard digital data is fed into the specific-standard digital input terminal; and a pathway determining unit that determines whether the video input and output pathway is "analog video input terminal—analog video output terminal", wherein the receiving unit produces only the audio data from the specific-standard digital data, when the specific-standard digital data is fed into the specific-standard digital input terminal while the video input and output pathway is "analog video input terminal—analog video output terminal".

When the specific-standard digital data is fed into the specific-standard digital input terminal although the video input and output pathway is set to "analog video input terminal—analog video output terminal", the receiving unit produces only the audio data from the specific-standard digital data. Accordingly, the video and audio processing device can produce the audio data from the specific-standard digital data to output the audio data even if the video output destination is set to the analog video output terminal.

According to another preferred embodiment of the present invention, a video and audio processing device comprises: at least one specific-standard digital input terminal into which specific-standard digital data including video data and audio data is fed; at least one analog video input terminal into which an analog video signal is fed; at least one specific-standard digital output terminal from which the specific-standard digital data is output; at least one analog video output terminal from which the analog video signal is output; a receiving unit that receives the specific-standard digital data fed into the specific-standard digital input terminal and produces video data and/or audio data from the specific-standard digital data; an image processing unit that performs image processing to the video data; a switching unit that switches a video input and output pathway at least between "analog video input terminal—image processing unit—analog video output terminal" and "specific-standard digital input terminal—image processing unit-specific—standard digital output terminal"; an input determining unit that determines whether the specific-standard digital data is fed into the specific-standard digital input terminal; and a pathway determining unit that determines whether the video input and output pathway is "analog video input terminal—image processing unit—analog video output terminal", wherein the receiving unit produces only the audio data from the specific-standard digital data, when the specific-standard digital data is fed into the specific-standard digital input terminal while the video input and output pathway is "analog video input terminal—image processing unit—analog video output terminal".

The image processing unit performs the image processing to the video signal fed from the analog video input terminal, and the video signal can be output from the analog video output terminal. When the specific-standard digital data is fed into the specific-standard digital input terminal although the video input and output pathway is set to "analog video input terminal—image processing unit—analog video output terminal", the receiving unit produces only the audio data from the specific-standard digital data. Accordingly, the video and audio processing device can produce the audio data from the specific-standard digital data to output the audio data even if the video output destination is set to the analog video output terminal.

Preferably, the receiving unit is put into a power-off state, when the specific-standard digital data is not fed into the specific-standard digital input terminal while the video input and output pathway is "analog video input terminal—image processing unit—analog video output terminal".

Preferably, the receiving unit produces the video data and/or the audio data from the specific-standard digital data when the video input and output pathway is "specific-standard digital input terminal—image processing unit-specific-standard digital output terminal".

Preferably, the switching unit is also capable of switching the video input and output pathway to "analog video input terminal—image processing unit-specific-standard digital output terminal", and the receiving unit is put into a power-off state when the video input and output pathway is "analog video input terminal—image processing unit-specific-standard digital output terminal".

Preferably, the video and audio processing device further comprises a state determining unit that determines whether a device connected to the specific-standard digital output terminal is capable of receiving the specific-standard digital data. The switching unit switches a video output destination to the specific-standard digital output terminal when the device connected to the specific-standard digital output terminal is capable of receiving the specific-standard digital data, and the switching unit switches the video output destination to the analog video output terminal when the device connected to the specific-standard digital output terminal is not capable of receiving the specific-standard digital data.

In such cases, based on whether the device connected to the specific-standard digital output terminal can receive the specific-standard digital data, the video output destination can automatically be switched between the device connected to the specific-standard digital output terminal and the device connected to the analog video output terminal. Accordingly, the problem that the video is not displayed due to the false video output destination set by the user manipulation can be solved.

DETAILED DESCRIPTION OF THE PREFERRED EMBODIMENTS

An AV amplifier 1 that is a video and audio processing device according to a preferred embodiment of the present invention will be described below with reference to the accompanying drawings. However, the present invention is not limited to the embodiments.

Figure 1A:
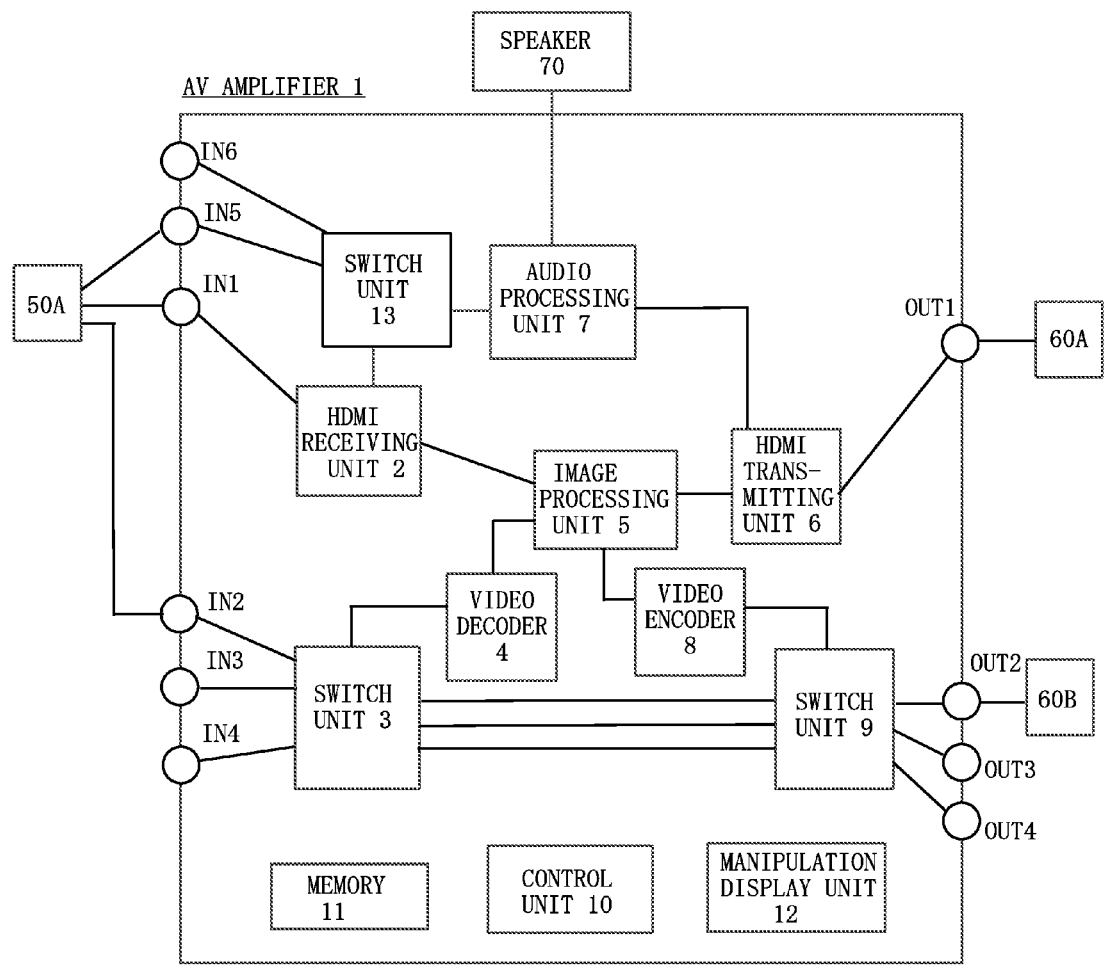
FIG. 1A is a block diagram illustrating an AV amplifier 1 according to an embodiment of the present invention.

FIG. 1A is a schematic diagram of the AV amplifier 1. The AV amplifier 1 includes one or a plurality of HDMI input terminals (specific-standard digital input terminals) IN1, one or a plurality of analog video input terminals (such as a component input terminal IN2, an S-video input terminal IN3, and a CVBS input terminal IN4), one or a plurality of audio (analog or digital) input terminals IN5 and IN6. HDMI (specific-standard digital data) is a standard in which digital video data and digital audio data can be transmitted. Content reproducing devices such as a DVD player, a VTR, and a CD player can be connected to each input terminal. In this case, a DVD player 50A is connected to the HDMI input terminal IN1, the component input terminal IN2, and the audio input terminal IN5.

The AV amplifier 1 includes one or a plurality of HDMI output terminals (specific-standard digital output terminals) OUT1, one or a plurality of analog video output terminals (such as a component output terminal OUT2, an S-video output terminal OUT3, and a CVBS output terminal OUT4). In the present embodiment, a display device 60A pursuant to an HDMI standard is connected to the HDMI output terminal OUT1, and a display device 60B that is not pursuant to the HDMI standard is connected to the component output terminal OUT2.

The AV amplifier 1 includes an HDMI receiving unit (hereinafter referred to as RX) 2, a switch unit 3, a video encoder 4, an image processing unit (hereinafter referred to as VSP) 5, an HDMI transmitting unit (hereinafter referred to as TX) 6, a audio processing unit 7, a video encoder 8, a switch unit 9, a control unit 10 such as a microcomputer, a memory 11 such as a ROM or RAM, a manipulation display unit 12, and a switch unit 13.

The RX 2 receives HDMI data fed into the HDMI input terminal IN1 (from the DVD player 50A), produces original video data (video data before HDMI conversion) from the received HDMI data, and supplies the original video data to the VSP 5. The RX 2 produces original audio data (audio data before HDMI conversion) from the received HDMI data, and supplies the original audio data to the audio processing unit 7 through the switch unit 13.

The switch unit 3 selects one video signal (i.e., the analog video input terminal into which the video signal supplied to the video decoder 4 is fed), supplied to the video decoder 4, from video signals fed into the analog video input terminals IN2 to IN4. The switch unit 3 also selects one or a plurality of video signals (i.e., the analog video input terminal into which the video signal supplied to the switch unit 9 is fed), supplied to the switch unit 9, from the video signals fed into the analog video input terminals IN2 to IN4. That is, the switch unit 3 acts as part of means for switching an analog video signal input and output pathway. The switch unit 3 switches the video signal input and output pathway when a selector (such as a DVD selector and a VTR selector) is changed by a user manipulation, or the switch unit 3 switches the video signal input and output pathway based on whether a device connected to the HDMI output terminal OUT1 can receive the HDMI data.

The video decoder 4 converts the video signal supplied from the switch unit 3 into digital video data, and supplies the digital video data to the VSP 5.

The VSP 5 selects one piece of video data to which image processing should be performed from pieces of video data supplied from the RX 2 and pieces of video data supplied from the video decoder 4. The VSP 5 selects one of the TX 6 and the video encoder 8 as an output destination of the video data to which the image processing has been performed. The VSP 5 performs image processing (such as resolution conversion and image quality adjustment) to the selected and fed video data, and outputs the video data to the selected one of the TX 6 and the video encoder 8.

The TX 6 converts the video data supplied from the VSP 5 into the HDMI data. The TX 6 supplies the converted HDMI data to the display device 60A through the HDMI output terminal OUT1. The TX 6 is connected to the RX of the display device 60A through an HDMI cable. Because a hot plug line is provided in the HDMI cable, the TX 6 receives a hot plug signal from the display device 60A. The TX 6 can determine that the display device 60A can receive the HDMI data when the hot plug signal is at a high level. When the hot plug signal is at a low level, the TX 6 can determine that the display device 60A cannot receive the HDMI data because the display device 60A is unconnected or is in a power-off state.

The switch unit 13 selects one audio signal (that is, the input terminal into which the audio signal supplied to the audio processing unit 7 is fed), supplied to the audio processing unit 7, from audio signals fed into the audio input terminals IN5 and IN6 and the audio data supplied from the RX 2. The switch unit 13 acts as means for switching a audio signal input pathway. The switch unit 13 switches the audio signal input pathway when the selector (such as the DVD selector and the VTR selector) is changed by the user manipulation, or the switch unit 3 switches the audio signal input pathway based on whether the device connected to the HDMI output terminal OUT1 can receive the HDMI data.

The audio processing unit 7 decodes the audio data supplied from the RX 2 through the switch unit 13, performs processes such as a delay process, an equalizing process, a D/A conversion process, a volume adjustment process, and an amplifying process, and the audio processing unit 7 supplies the audio signal to a speaker 70 connected to the outside. The audio processing unit 7 performs the processes to the audio signal fed from the audio input terminals IN5 and IN6 through the switch unit 13, and supplies the audio signal to the speaker 70 connected to the outside.

The video encoder 8 converts the video data supplied from the VSP 5 into an analog video signal, and supplies the analog video signal to the switch unit 9.

The switch unit 9 selects a video signal, output to the analog video output terminals OUT2 to OUT4, from video signals supplied from the switch unit 3 and the video encoder 8. That is, the switch unit 9 acts as part of means for switching the analog video signal input and output pathway. The switch unit 9 switches the video signal input and output pathway when the selector (such as the DVD selector and the VTR selector) is changed by the user manipulation, or the switch unit 9 switches the video signal input and output pathway based on whether the device connected to the HDMI output terminal OUT1 can receive the HDMI data.

The control unit 10 controls each unit of the AV amplifier 1, and performs each process described below by executing a video and audio processing program stored in the memory 11. For example, the control unit 10 detects the hot plug signal output from the display device 60A connected to the HDMI output terminal OUT1, sets a video output destination to the HDMI output terminal OUT1 when the hot plug signal is at the high level, and sets a video output destination to the analog video output terminal (component output terminal OUT2) when the hot plug signal is at the low level. The control unit 10 sets the video input source to the analog video input terminals IN2 to IN4 when the video output destination is set to the component output terminal OUT2. Accordingly, even if the video output destination is set to the HDMI output terminal OUT1 by the user manipulation, the video output destination can be automatically changed to the component output terminal OUT2 to output the video signal to the display device 60B once the display device 60A is put into the power-off state.

The control unit 10 determines whether the HDMI data is fed into the HDMI input terminal IN1, when the video input and output pathway is set to "analog video input terminal—VSP 5-analog video output terminal". When the HDMI data is fed into the HDMI input terminal IN1, the control unit 10 sets only the audio input source to the HDMI input terminal IN1, causes the RX 2 to produce only the audio data from the HDMI data, and causes the RX 2 to supply the audio data to the audio processing unit 7. Thus, since the audio input source is set to the HDMI input terminal IN1 even if the video input source is set to the analog video input terminals IN2 to IN4, the audio signal produced from the HDMI data can be amplified and output to the speaker 70. The HDMI data has higher sound quality than the audio signal fed from the audio input terminals IN5 and IN6.

An operation of the video and audio processing device of the present invention will be described below. FIGS. 2 to 10 are flowcharts illustrating the processes of the control unit 10.

(Main Routine)

Figure 2:
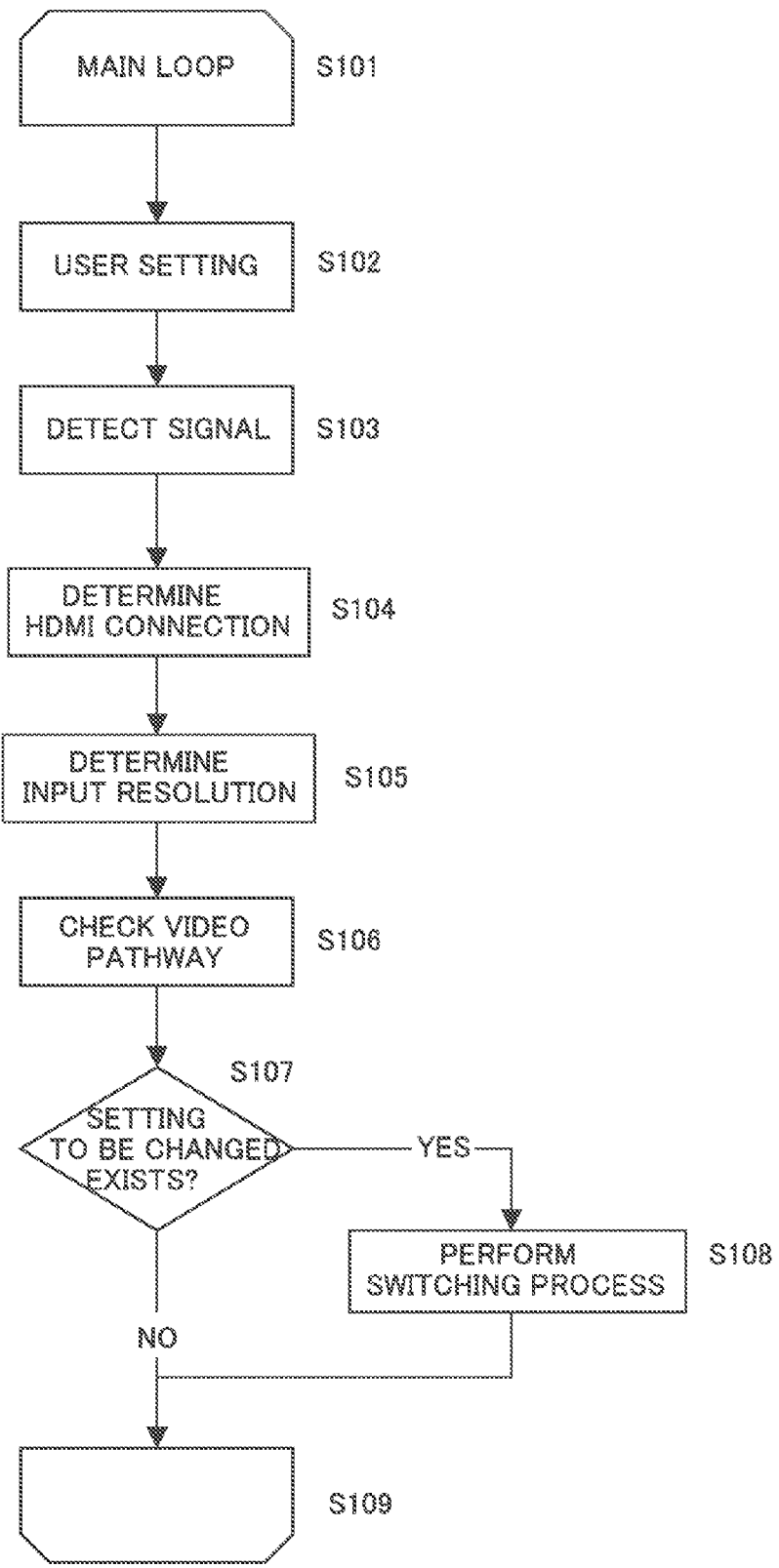
FIG. 2 is a flowchart illustrating a process of a control unit 10.

FIG. 2 illustrates a main routine of the control unit 10. The control unit 10 confirms whether the setting is changed by the user manipulation (S102). For example, the control unit 10 confirms whether the selector is changed, or whether an output resolution is changed. The control unit 10 confirms whether a signal is fed into each of the video input terminals IN1 to IN4 (S103). The control unit 10 confirms whether the display device 60A is connected to the HDMI output terminal OUT1 to be able to receive the HDMI data (S104). The control unit 10 obtains resolution information on the video signal fed into the currently-selected video input terminals IN1 to IN4 (S105). The control unit 10 determines the video input and output pathway based on the results in S102 to S105 (S106). The control unit 10 determines whether the setting to be changed from the current state exists based on the results in S102 to S106 (S107). When the setting to be changed from the current state exists (YES in S107), the control unit 10 performs a process for switching the signal input and output pathway (S108). Each process will be described in detail below.

(Input Video Signal Detection Process)

Figure 3:
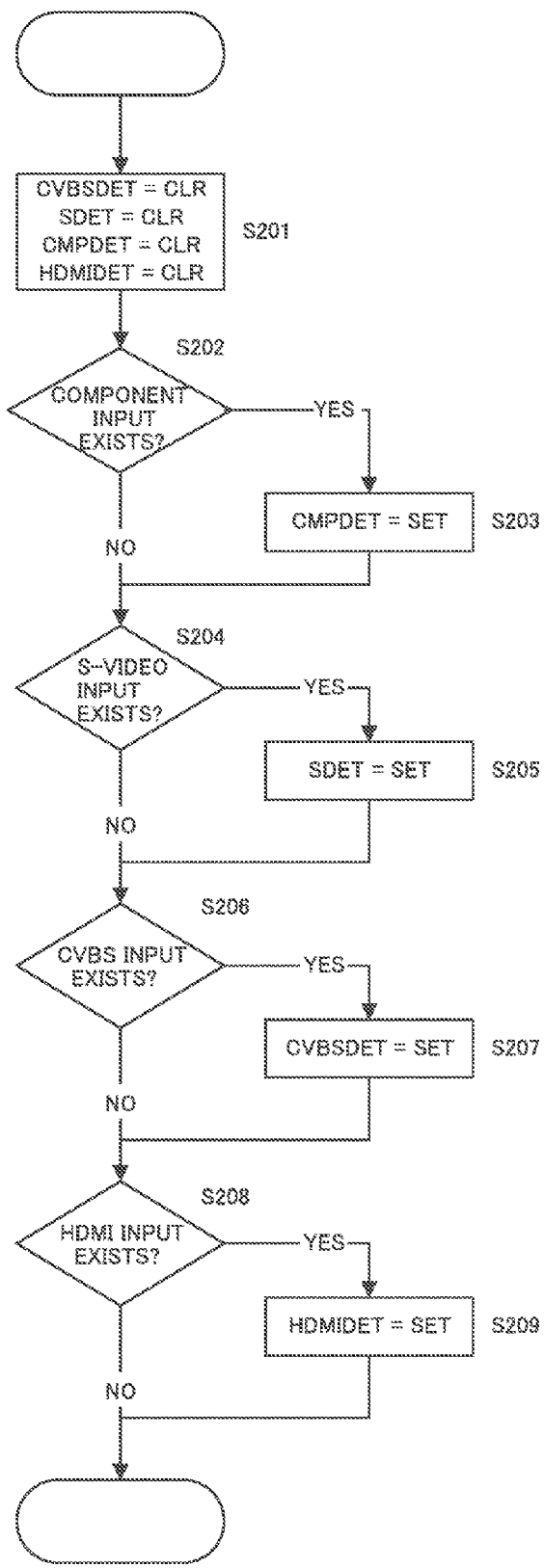
FIG. 3 is a flowchart illustrating a process of the control unit 10.

FIG. 3 illustrates the detailed process in S103. Flags (CVB-SDET, SDET, CMPDET, and HDMIDET) are stored in the memory 11 to store the video signal detection result. The control unit 10 clears all the flags (S201). The control unit 10 determines whether the video signal is fed into the component input terminal IN2 (S202). When the video signal is fed into the component input terminal IN2 (YES in S202), the control unit 10 sets the flag of CMPDET (S203). The control unit 10 determines whether the video signal is fed into the S-video input terminal IN3 (S204). When the video signal is fed into the S-video input terminal IN3 (YES in S204), the control unit 10 sets the flag of SDET (S205). The control unit 10 determines whether the video signal is fed into the CVBS input terminal IN4 (S206). When the video signal is fed into the CVBS input terminal IN4 (YES in S206), the control unit 10 sets the flag of CVBSDET (S207). The control unit 10 determines whether the HDMI data is fed into the HDMI input terminal IN1 (S208). When the HDMI data is fed into the HDMI input terminal IN1 (YES in S208), the control unit 10 sets the flag of HDMIDET (S209).

(Process for Determining Whether Device Connected to HDMI Output Terminal OUT1 Can Receive HDMI Data)

Figure 4:
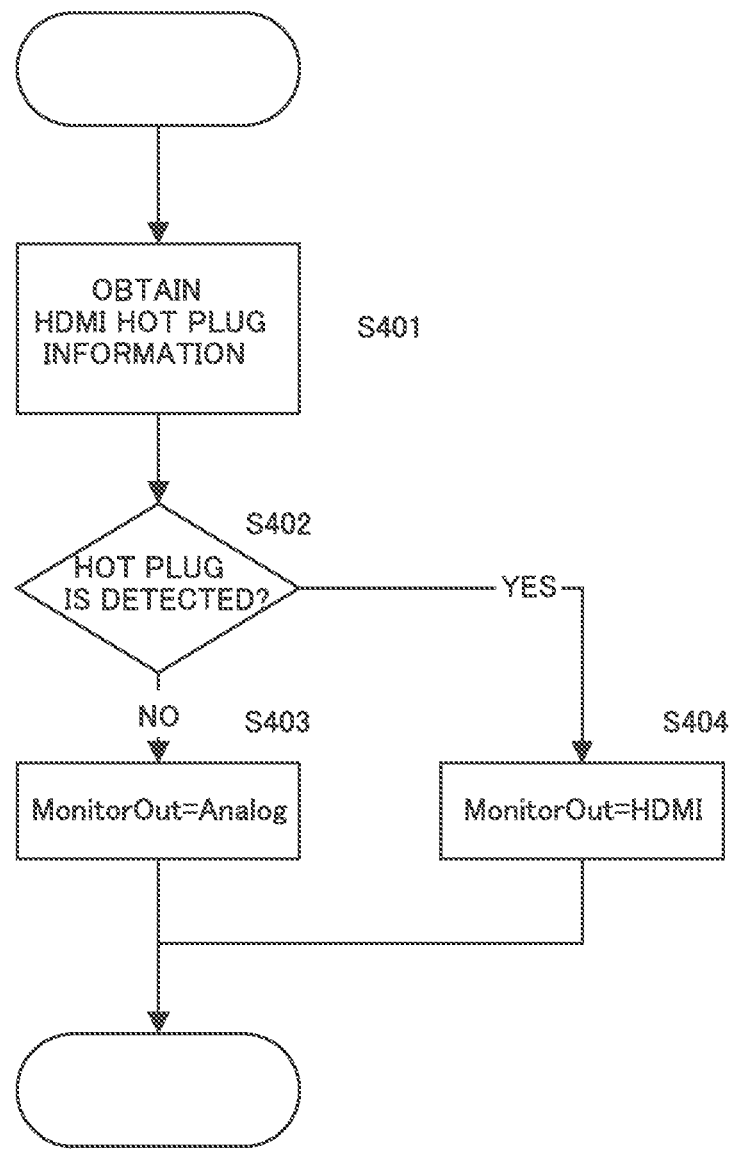
FIG. 4 is a flowchart illustrating a process of the control unit 10.

FIG. 4 illustrates the detailed process in S104. The control unit 10 detects the hot plug signal that is output from the display device 60A connected to the HDMI output terminal OUT1 (S401). The control unit 10 determines whether a high-level hot plug signal can be detected (S402). The high-level hot plug signal is detected when the display device 60A is connected to the HDMI output terminal OUT1 to be able to receive the HDMI data (YES in S402). At this point, the control unit 10 sets the video output destination (Monitor Out) to the HDMI output terminal OUT1, that is, "Monitor Out=HDMI" is stored in the memory 11. On the other hand, when the display device 60A is not connected to the HDMI output terminal OUT1, or when the display device 60A is in the power-off state, the low-level hot plug signal is detected (NO in S402). At this point, the control unit 10 sets the video output destination (Monitor Out) to one of predetermined analog video output terminals OUT2 to OUT4 (in this case, component output terminal OUT2), that is, "Monitor Out=Analog" is stored in the memory 11.

(Obtaining Resolution Information)

Figure 5:
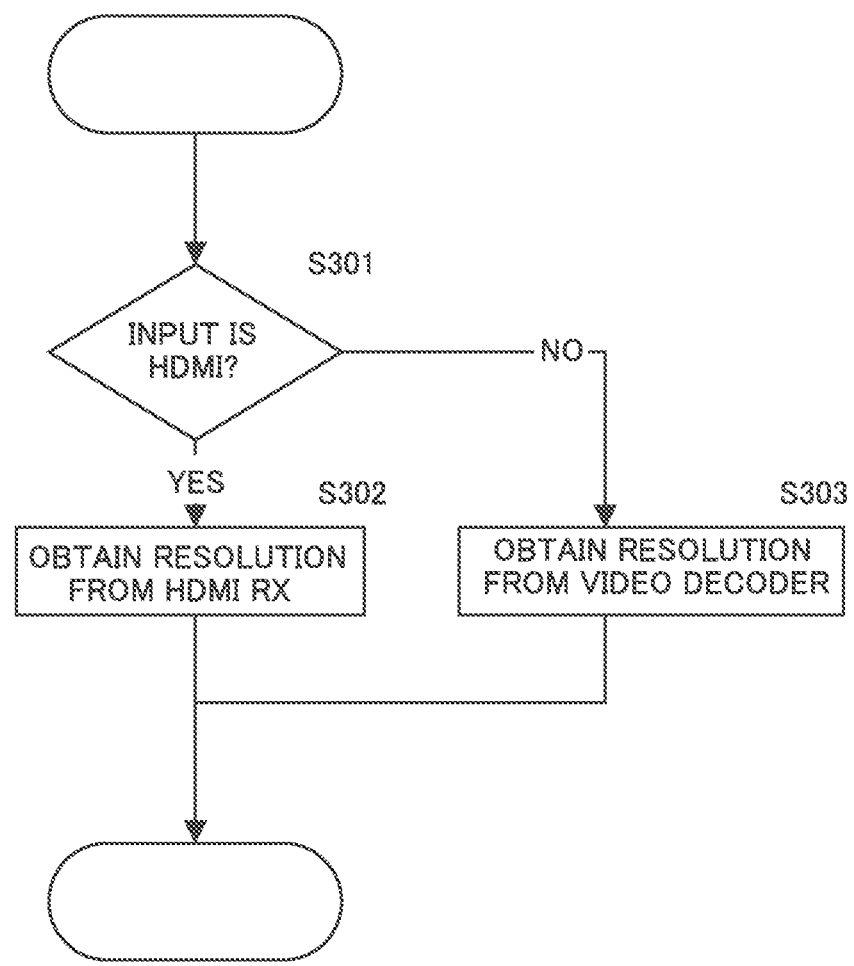
FIG. 5 is a flowchart illustrating a process of the control unit 10.

FIG. 5 illustrates the detailed process in S105. The control unit 10 determines whether the video input to the VSP 5 is set to be from the RX2 (S301). When the video input to the VSP 5 is set to be from the RX2 (YES in S301), the control unit 10 obtains the resolution information on the fed video data from the RX 2 (S302). On the other hand, when the video input to the VSP 5 is set to be from video decoder 4 (NO in S301), the control unit 10 obtains the resolution information on the fed video data from the video decoder 4 (S303).

(Determination of Video Input and Output Pathway)

Figure 6:
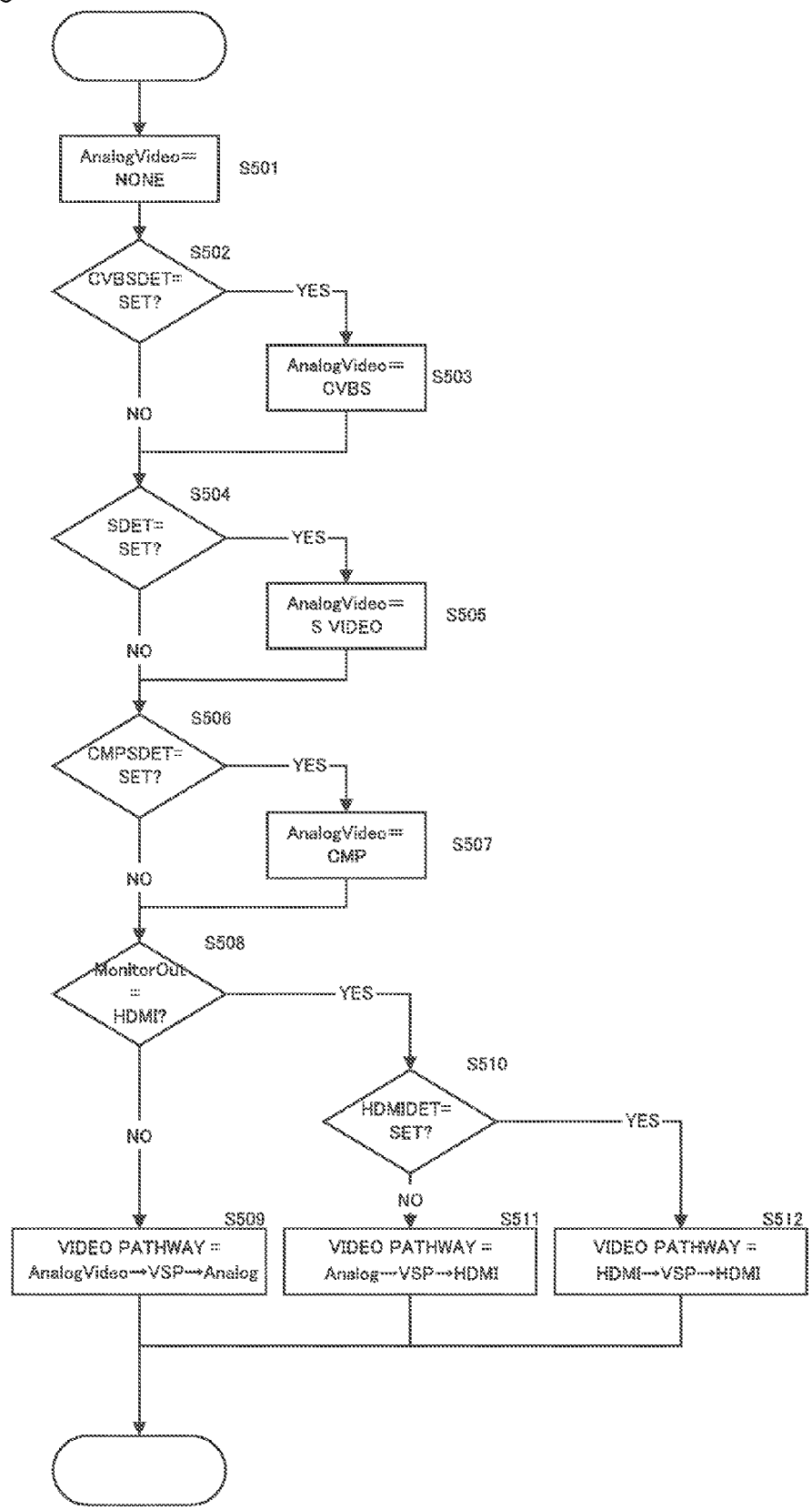
FIG. 6 is a flowchart illustrating a process of the control unit 10.

FIG. 6 illustrates the detailed process in S106. An Analog Video variable used to specify the analog video input terminal in the video input and output pathway is stored in the memory 11. In S501 to S507, the Analog Video variable is written based on the result of the input signal detection process of FIG. 3. Priority order of the Analog Video variable is the component input terminal IN2, the S-video input terminal IN3, and the CVBS input terminal IN4. The control unit 10 sets the Analog Video variable to NONE (S501). The control unit 10 determines whether the flag of CVBSDET is set (S502). When the flag of CVBSDET is set (YES in S502), because the video signal is fed into the CVBS input terminal IN4, the control unit 10 writes CVBS in the Analog Video variable (S503). The control unit 10 then determines whether the flag of SDET is set (S504). When the flag of SDET is set (YES in S504), because the video signal is fed into the S-video input terminal IN3, the control unit 10 writes SVIDEO in the Analog Video variable (S505). The control unit 10 then determines whether the flag of CMPDET is set (S506). When the flag of CMPDET is set (YES in S506), because the video signal is fed into the component input terminal IN2, the control unit 10 writes CMP in the Analog Video variable (S507).

The control unit 10 determines whether the video output destination Monitor Out set in FIG. 4 is the HDMI output terminal OUT1 (S508). When Monitor Out is not the HDMI output terminal OUT1 but the analog video output terminal OUT2 (NO in S508), the control unit 10 sets the video input and output pathway to "analog video input terminal—VSP 5-analog video output terminal OUT2". At this point, the analog video input terminal is the analog video input terminals IN2 to IN4 written in the Analog Video variable set in S501 to S507. That is, when the CMP is written in the Analog Video variable, the analog video input terminal becomes the component input terminal IN2.

When Monitor Out is the HDMI output terminal OUT1 (YES in S508), the control unit 10 determines whether the flag of HDMIDET is set in S209 of FIG. 3 (S510). When the flag of HDMIDET is not set (NO in S510), because the HDMI data is not fed into the HDMI input terminal IN1, the control unit 10 sets the video input and output pathway to "analog video input terminal—VSP 5-HDMI output terminal OUT1" (S511). When the flag of HDMIDET is set (YES in S510), because the HDMI data is fed into the HDMI input terminal IN1, the control unit 10 sets the video input and output pathway to "HDMI input terminal IN1-VSP 5-HDMI output terminal OUT1" (S512).

(Signal Switching Process)

Figure 7:
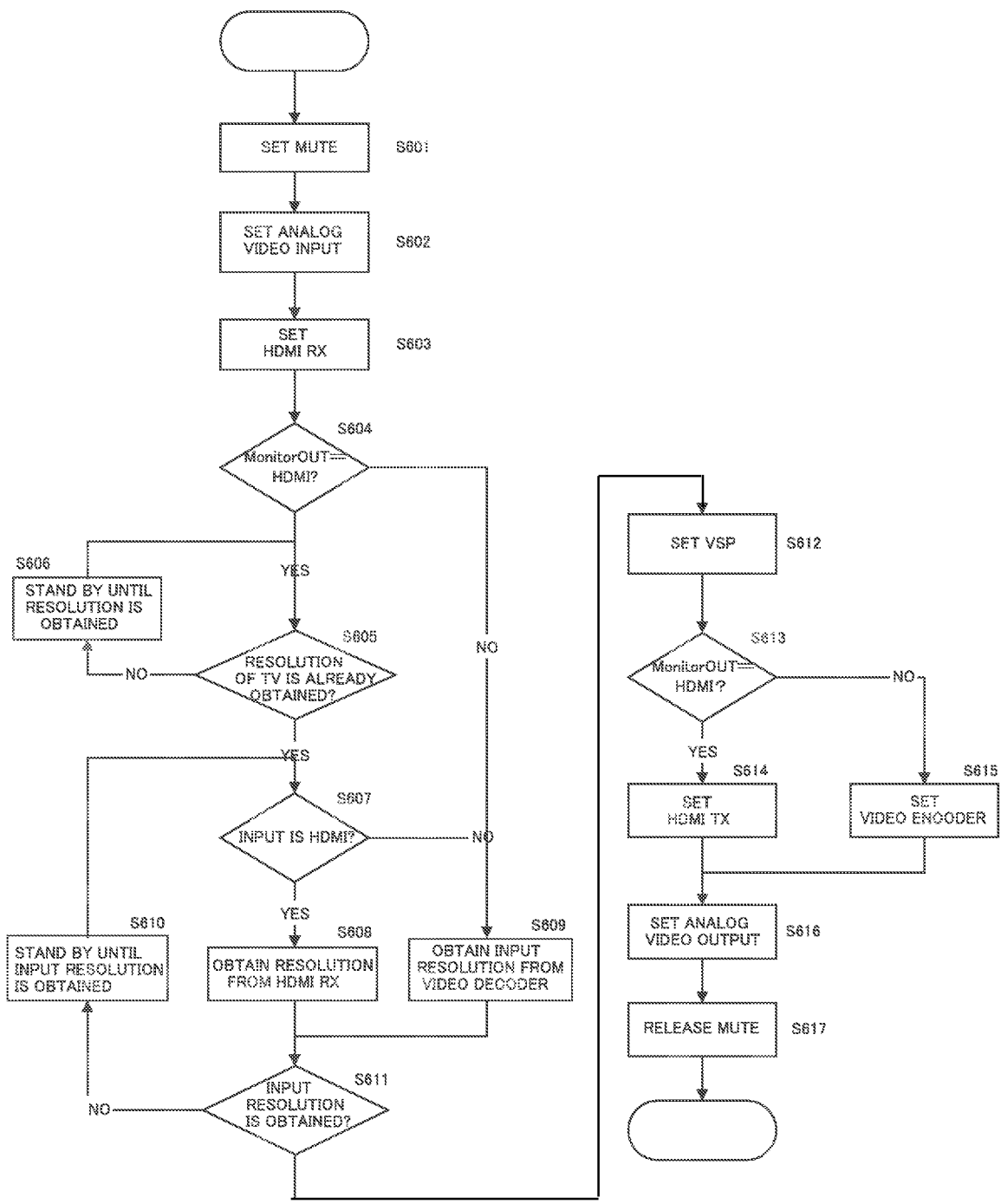
FIG. 7 is a flowchart illustrating a process of the control unit 10.

FIG. 7 illustrates the detailed process in S108. In switching the video input and output pathway, the control unit 10 performs mute processing to the video signal such that the disturbed video is not output to the display device (S601). The control unit 10 controls the switch unit 3 to set the analog video signal input pathway (S602). The control unit 10 performs each setting of the RX 2 (described in detail below) (S603). For example, when a plurality of HDMI input terminals are provided, the control unit 10 controls the RX 2 such that one HDMI input terminal is selected (S603).

The control unit 10 then determines whether Monitor OUT is set to the HDMI output terminal OUT1 (S604). When Monitor OUT is not the HDMI output terminal OUT1 but the analog video output terminal (NO in S604), the flow proceeds to S609. When Monitor OUT is the HDMI output terminal OUT1 (YES in S604), the control unit 10 determines whether the resolution information is already obtained from the display device 60A connected to the HDMI output terminal OUT1 (S605). When the resolution information is not obtained from the display device 60A (NO in S605), the control unit 10 stands by until the resolution information is obtained (S606). The control unit 10 then determines whether the video signal input source to the VSP 5 is the RX 2 (S607). When the video signal input source to the VSP 5 is the RX 2 (YES in S607), the control unit 10 obtains the resolution information on the fed video data from the RX 2 (S608). On the other hand, when the video signal input source to the VSP 5 is the video decoder 4 (NO in S607), the control unit 10 obtains the resolution information on the fed video data from the video decoder 4 (S609). The control unit 10 determines whether the resolution information is already obtained (S611). When the resolution information is not obtained (NO in S611), the control unit 10 stands by until the resolution information is obtained (S610).

The control unit 10 then performs the setting of the VSP 5 (described in detail below) (S612). The control unit 10 determines whether Monitor OUT is set to the HDMI output terminal OUT1 (S613). When Monitor OUT is the HDMI output terminal OUT1 (YES in S613), the control unit 10 performs the settings such as the resolution setting of the TX 6 (S614). When Monitor OUT is not the HDMI output terminal OUT1 but the analog video output terminal (NO in S613), the control unit 10 performs the settings such as the resolution setting of the video encoder 8 (S615). The control unit 10 controls the switch unit 9 to set the analog video signal output pathway (S616). Then the control unit 10 releases the video mute processing.

(Process for Setting VSP 5)

Figure 8:
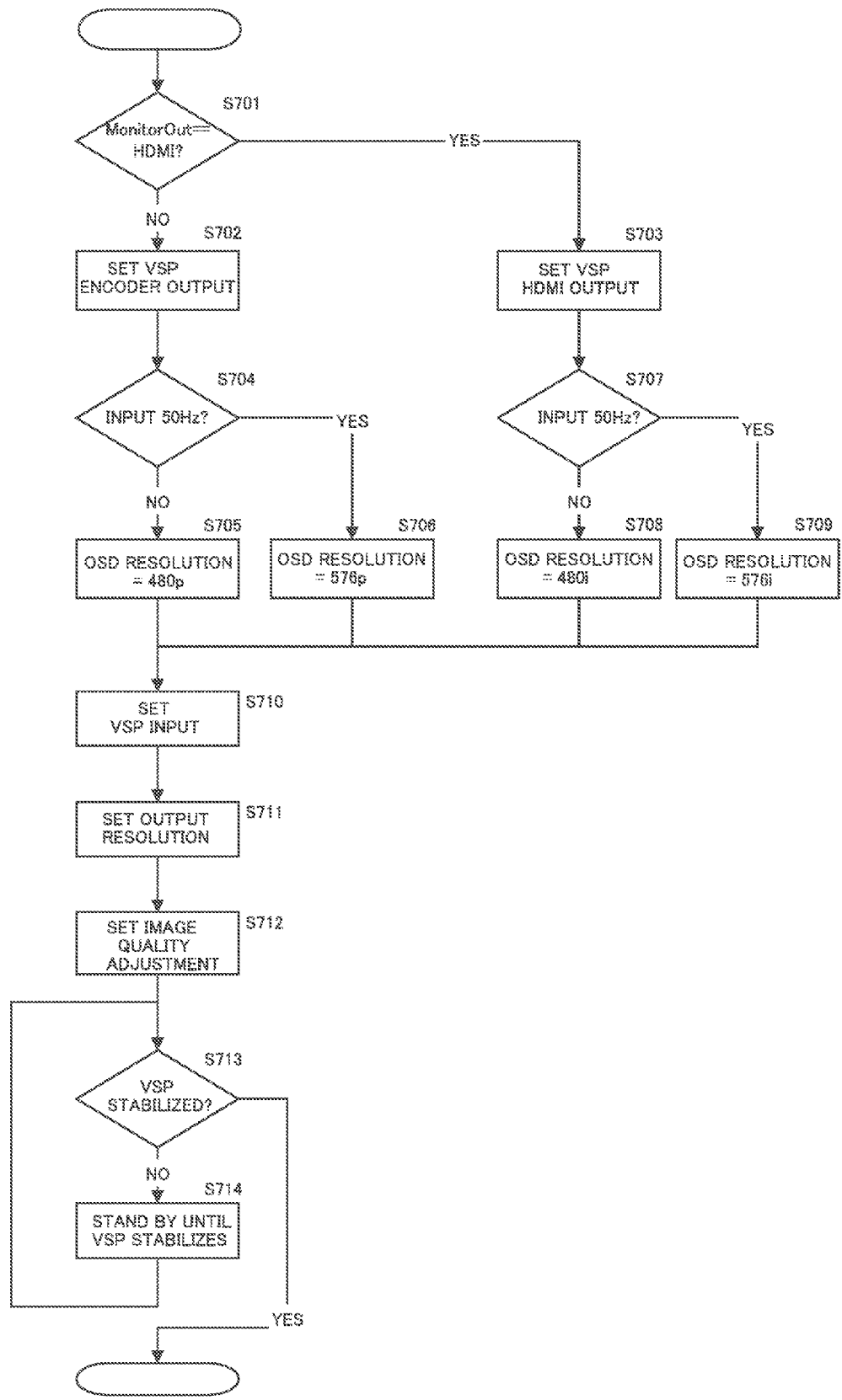
FIG. 8 is a flowchart illustrating a process of the control unit 10.

FIG. 8 illustrates the detailed process in S612 of FIG. 7. The control unit 10 determines whether Monitor OUT is set to the HDMI output terminal OUT1 (S701). When Monitor OUT is not the HDMI output terminal OUT1 but the analog video output terminal (NO in S701), the control unit 10 selects the video encoder 8 as the output destination of the VSP 5 (S702). The control unit 10 determines whether the video fed into the VSP 5 has a frequency of 50 Hz (S704). When the video does not have the frequency of 50 Hz (NO in S704), the control unit 10 sets the OSD output resolution of the VSP 5 to 480p (S705). When the video has the frequency of 50 Hz (YES in S704), the control unit 10 sets the OSD output resolution of the VSP 5 to 576p (S706).

When Monitor OUT is the HDMI output terminal OUT1 (YES in S701), the control unit 10 selects the TX 6 as the output destination of the VSP 5 (S703). The control unit 10 determines whether the video fed into the VSP 5 has a frequency of 50 Hz (S707). When the video does not have the frequency of 50 Hz (NO in S707), the control unit 10 sets the OSD output resolution of the VSP 5 to 480i (S708). When the video has the frequency of 50 Hz (YES in S707), the control unit 10 sets the OSD output resolution of the VSP 5 to 576i (S709).

The control unit 10 then sets the input source to the VSP 5 based on the video input and output pathway set in FIG. 6 (S710). That is, the control unit 10 sets the video decoder 4 as the input source to the VSP 5 when the video input and output pathway is set to "analog video input terminal—VSP 5-analog video output terminal OUT2" or "analog video input terminal—VSP 5-HDMI output terminal OUT1", and the control unit 10 selects the RX 2 as the input source to the VSP 5 when the video input and output pathway is set to "HDMI input terminal IN1-VSP 5-HDMI output terminal OUT1".

The control unit 10 then performs output resolution setting and image quality adjustment setting of the VSP 5 (S711 and S712). The control unit 10 determines whether the VSP 5 has output the specified video data and stabilized (S713). When the VSP 5 is not stabilized (NO in S713), the control unit 10 stands by until the VSP 5 is stabilized (S714). After the VSP 5 is stabilized, the setting process of the VSP 5 is ended.

(Input and Output Switching Process of Analog Video Signal)

Figure 9A:
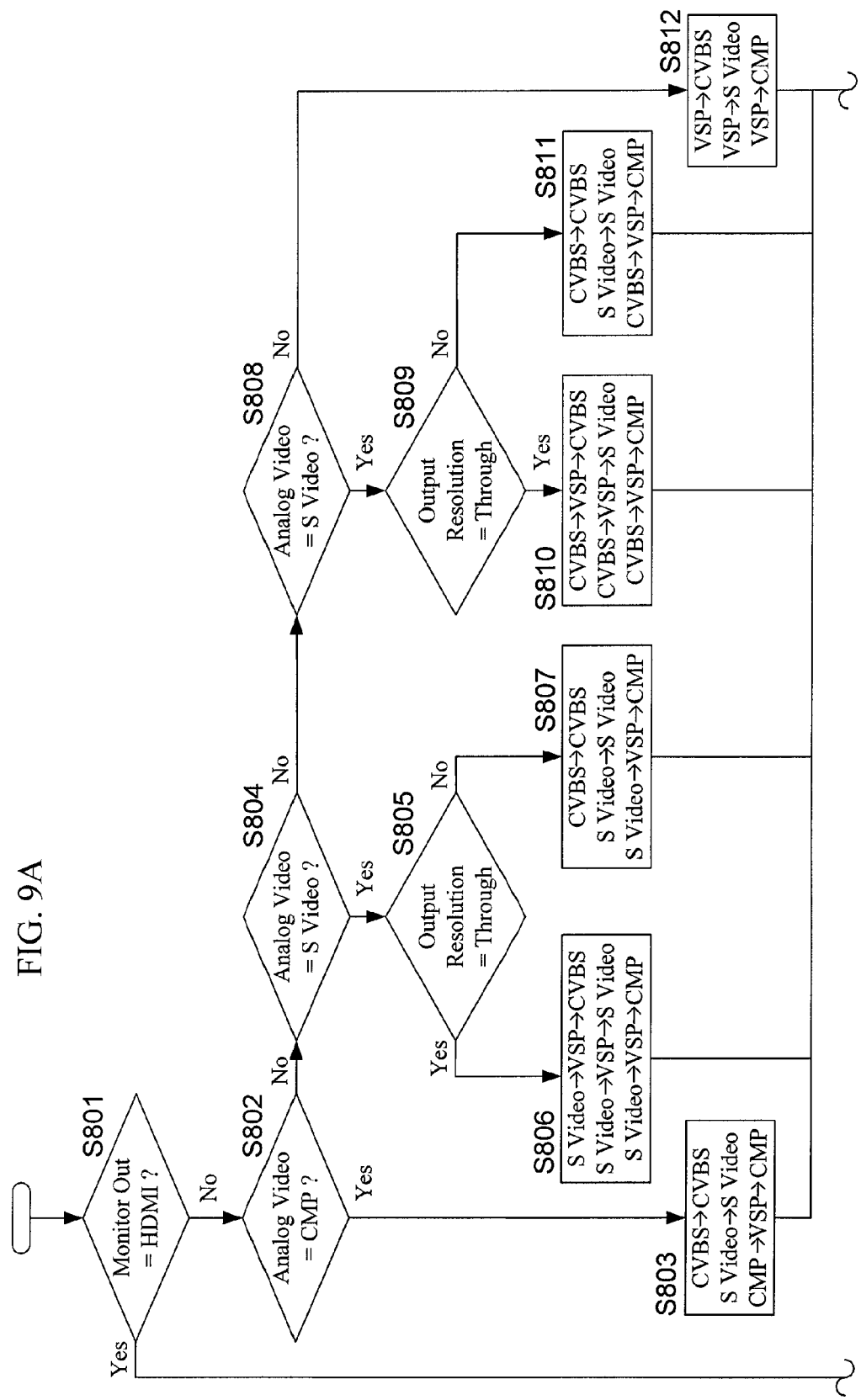
FIGS. 9A and 9B are a flowchart illustrating a process of the control unit 10.
Figure 9B:
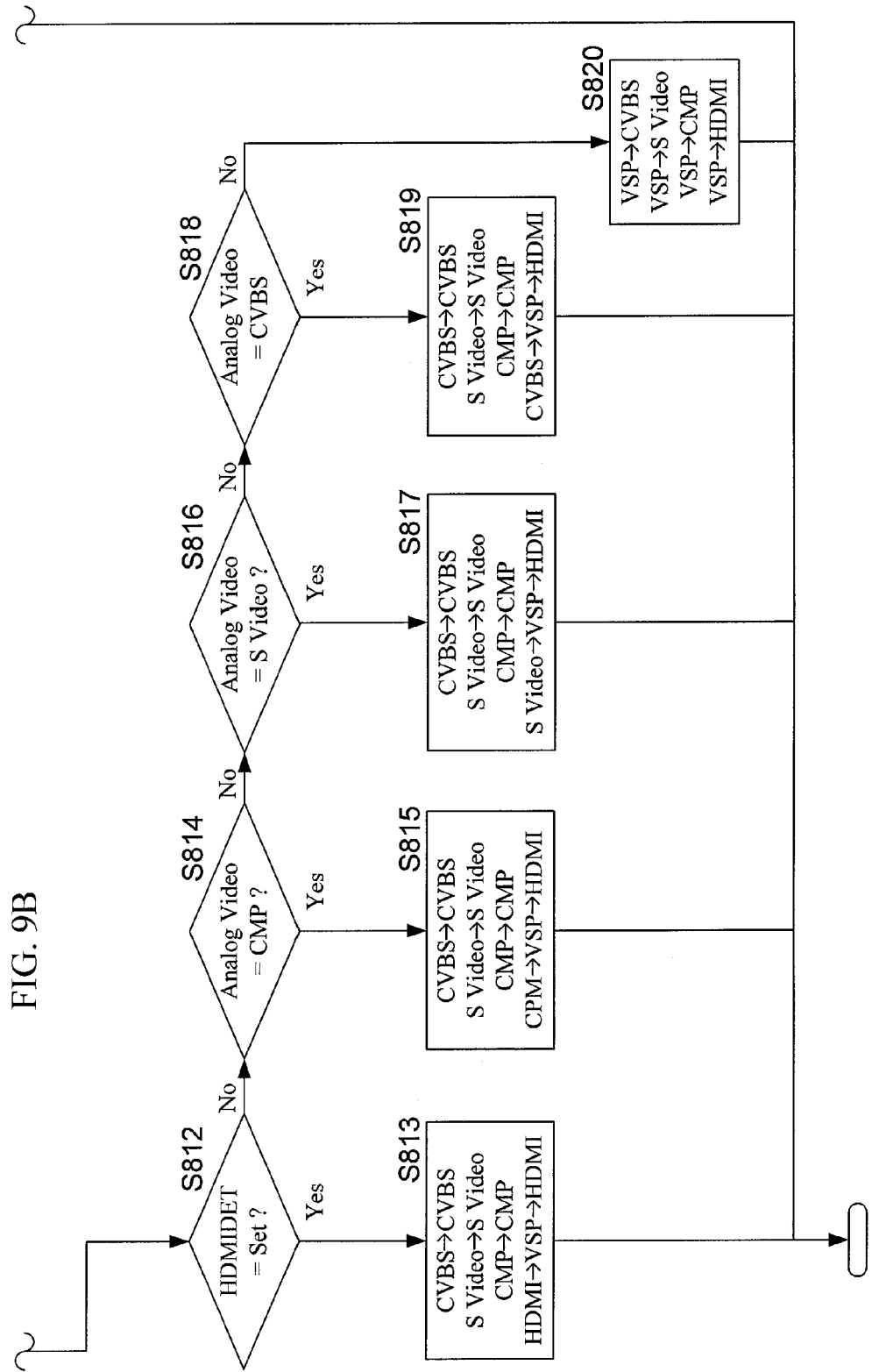

FIGS. 9A and 9B illustrate the detailed processes in S602 and S616, and illustrate the analog video signal switching process performed by the switch units 3 and 9. The control unit 10 determines whether Monitor OUT is set to the HDMI output terminal OUT1 (S801). When Monitor OUT is the analog video output terminal (NO in S801), the control unit 10 determines whether the Analog Video variable is CMP (S802). When the Analog Video variable is CMP (YES in S802), the control unit 10 performs the switching control of the switch units 3 and 9 such that the video signal fed from the CVBS input terminal IN4 is output from the CVBS output terminal OUT4, the video signal fed from the S-video input terminal IN3 is output from the S-video output terminal OUT3, and the video signal fed from the component input terminal IN2 is output from the component output terminal OUT2 through the VSP 5 (S803).

When the Analog Video variable is not CMP (NO in S802), the control unit 10 determines whether the Analog Video variable is SVIDEO (S804). When the Analog Video variable is SVIDEO (YES in S804), the control unit 10 determines whether the output resolution setting is set to "Through" (S805). When the output resolution setting is set to "Through" (YES in S805), the control unit 10 performs the switching control of the switch units 3 and 9 such that the video signal fed from the S-video input terminal IN3 is output from the CVBS output terminal OUT4, the S-video output terminal OUT3, and the component output terminal OUT2 through the VSP 5 (S806). When the output resolution setting is not set to "Through" (NO in S805), the control unit 10 performs the switching control of the switch units 3 and 9 such that the video signal fed from the CVBS input terminal IN4 is output from the CVBS output terminal OUT4, the video signal fed from the S-video input terminal IN3 is output from the S-video output terminal OUT3, and the video signal fed from the S-video input terminal IN3 is output from the component output terminal OUT2 through the VSP 5 (S807).

When the Analog Video variable is not SVIDEO (NO in S804), the control unit 10 determines whether the Analog Video variable is CVBS (S808). When the Analog Video variable is CVBS (YES in S808), the control unit 10 determines whether the output resolution setting is set to "Through" (S809). When the output resolution setting is set to "Through" (YES in S809), the control unit 10 performs the switching control of the switch units 3 and 9 such that the video signal fed from the CVBS input terminal IN4 is output from the CVBS output terminal OUT4, the S-video output terminal OUT 3, and the component output terminal OUT2 through the VSP 5 (S810). When the output resolution setting is not set to "Through" (NO in S809), the control unit 10 performs the switching control of the switch units 3 and 9 such that the video signal fed from the CVBS input terminal IN4 is output from the CVBS output terminal OUT4, the video signal fed from the S-video input terminal IN3 is output from the S-video output terminal OUT3, and the video signal fed from the CVBS input terminal IN4 is output from the component output terminal OUT2 through the VSP 5 (S811).

When the Analog Video variable is not CVBS (NO in S808), the control unit 10 performs the switching control of the switch units 3 and 9 such that the video signal (for example, blue back) fed from the VSP 5 is output from the CVBS output terminal OUT4, the S-video output terminal OUT3, and the component output terminal OUT2 (S812).

When Monitor OUT is the HDMI output terminal (YES in S801), the control unit 10 determines whether the flag of HDMIDET is set (S812). When the flag of HDMIDET is set (YES in S812), the control unit 10 performs the switching control of the switch units 3 and 9 such that the video signal fed from the CVBS input terminal IN4 is output from the CVBS output terminal OUT4, the video signal fed from the S-video input terminal IN3 is output from the S-video output terminal OUT3, the video signal fed from the component input terminal IN2 is output from the component output terminal OUT2, and the video signal fed from the HDMI input terminal IN1 is output from the HDMI output terminal OUT1 through the VSP 5 (S813).

When the flag of HDMIDET is not set (NO in S812), the control unit 10 determines whether the Analog Video variable is CMP (S814). When the Analog Video variable is CMP (YES in S814), the control unit 10 performs the switching control of the switch units 3 and 9 such that the video signal fed from the CVBS input terminal IN4 is output from the CVBS output terminal OUT4, the video signal fed from the S-video input terminal IN3 is output from the S-video output terminal OUT3, the video signal fed from the component input terminal IN2 is output from the component output terminal OUT2, and the video signal fed from the component input terminal IN2 is output from the HDMI output terminal OUT1 through the VSP 5 (S815).

When the Analog Video variable is not CMP (NO in S814), the control unit 10 determines whether the Analog Video variable is SVIDEO (S816). When the Analog Video variable is SVIDEO (YES in S816), the control unit 10 performs the switching control of the switch units 3 and 9 such that the video signal fed from the CVBS input terminal IN4 is output from the CVBS output terminal OUT4, the video signal fed from the S-video input terminal IN3 is output from the S-video output terminal OUT3, the video signal fed from the component input terminal IN2 is output from the component output terminal OUT2, and the video signal fed from the S-video input terminal IN3 is output from the HDMI output terminal OUT1 through the VSP 5 (S817).

When the Analog Video variable is not SVIDEO (NO in S816), the control unit 10 determines whether the Analog Video variable is CVBS (S818). When the Analog Video variable is CVBS (YES in S818), the control unit 10 performs the switching control of the switch units 3 and 9 such that the video signal fed from the CVBS input terminal IN4 is output from the CVBS output terminal OUT4, the video signal fed from the S-video input terminal IN3 is output from the S-video output terminal OUT3, the video signal fed from the component input terminal IN2 is output from the component output terminal OUT2, and the video signal fed from the CVBS input terminal IN4 is output from the HDMI output terminal OUT1 through the VSP 5 (S819).

When the Analog Video variable is not CVBS (NO in S818), the control unit 10 performs the switching control of the switch units 3 and 9 such that the video signal (blue back) fed from the VSP 5 is output from the CVBS output terminal OUT4, the S-video output terminal OUT3, the component output terminal OUT2, and the HDMI output terminal OUT1 (S820).

(Setting Process of RX 2)

Figure 10:
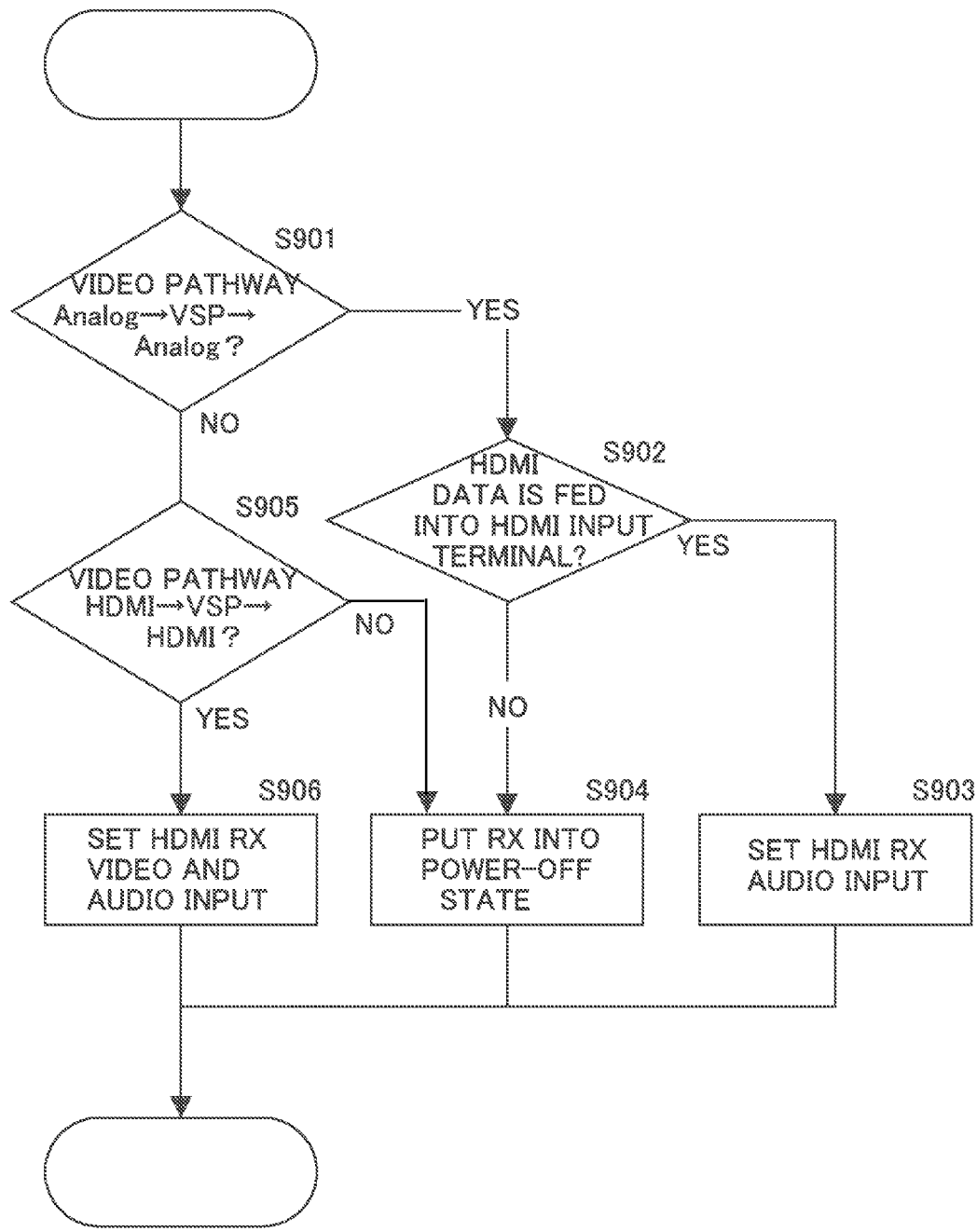
FIG. 10 is a flowchart illustrating a process of the control unit 10.

FIG. 10 illustrates the detailed process in S603 of FIG. 7. The control unit 10 determines whether the video input and output pathway is "analog video input terminal—VSP 5-analog video output terminal OUT2" based on the determination result of the video input and output pathway in FIG. 6 (S901). When the video input and output pathway is "analog video input terminal—VSP 5-analog video output terminal OUT2" (YES in S901), the control unit 10 determines whether the HDMI data is fed into the HDMI input terminal IN1 (S902). When the HDMI data is fed into the HDMI input terminal IN1 (YES in S902), the control unit 10 causes the switch unit 13 to select the RX 2, causes the RX 2 to receive the HDMI data fed into the HDMI input terminal IN1 while the RX 2 is not put into the power-off state, causes the RX 2 to produce only the audio data from the HDMI data, and causes the RX 2 to supply the audio data to the audio processing unit 7 through the switch unit 13 (S903). The control unit 10 causes the RX 2 not to produce the video data from the HDMI data fed into the HDMI input terminal INI, and the control unit 10 causes the RX 2 not to supply the video data to the VSP 5.

On the other hand, when the HDMI data is not fed into the HDMI input terminal IN1 (NO in S902), the control unit 10 controls the RX 2 such that the RX 2 is put into the power-off state (S904). The control unit 10 causes the switch unit 13 to select one of the audio input terminals IN5 and IN6.

When the video input and output pathway is not "analog video input terminal—VSP 5-analog video output terminal OUT2" (NO in S901), the control unit 10 determines whether the video output pathway is "HDMI input terminal IN1-VSP 5-HDMI output terminal OUT1" (S905). When the video output pathway is "HDMI input terminal IN1-VSP 5-HDMI output terminal OUT1" (YES in S905), the control unit 10 causes the switch unit 13 to select the RX 2, causes the RX 2 to receive the HDMI data fed into the HDMI input terminal IN1, causes the RX 2 to produce the video data from the HDMI data to supply the video data to the VSP 5, and the control unit 10 causes the RX 2 to produce the audio data from the HDMI data, and causes the RX 2 to supply the audio data to the audio processing unit 7 through the switch unit 13 (S906).

When the video output pathway is "analog video input terminal—VSP 5-HDMI output terminal OUT1" (NO in S905), the control unit 10 controls the RX 2 such that the RX 2 is put into the power-off state (S904). The control unit 10 causes the switch unit 13 to select one of the audio input terminals IN5 and IN6.

An advantage of the process of FIG. 10 will be described below.

(Case 1)

As illustrated in FIG. 1A, the DVD player 50A is connected to the HDMI input terminal IN1, the component input terminal IN2, and the audio input terminal IN5, and the HDMI data, the analog video signal, and the audio signal are fed into the input terminals IN1, IN2, and IN5, respectively. The display device 60A is connected to the HDMI output terminal OUT1, and the display device 60B is connected to component output terminal OUT2. The display device 60A is put into the power-on state, and the display device 60B is put into the power-off state. At this point, the HDMI data fed from the DVD player 50A into the HDMI input terminal IN1 is supplied to the RX 2. The RX 2 produces the video data from the HDMI data to supply the video data to the VSP 5, and the RX 2 produces the audio data from the HDMI data to supply the audio data to the audio processing unit 7 through the switch unit 13. The video data is supplied to the TX 6 through the VSP 5, and the TX 6 converts the video data into the HDMI data to supply the HDMI data to the display device 60A through the HDMI output terminal OUT1. Accordingly, the video data is displayed on the display device 60A. The audio processing unit 7 amplifies the audio data to supply the amplified audio data to the speaker 70, thereby reproducing the audio.

At this point, the display device 60A is put into the power-off state, and the display device 60B is put into the power-on state. Referring to FIG. 4, when the display device 60A is put into the power-off state, because the hot plug signal becomes the low level (NO in S402), Monitor OUT is set to Analog (component output terminal OUT2). Referring to FIG. 9, Monitor OUT is Analog (NO in S801), and the Analog Video variable is CMP (YES in S802). Therefore, the switching control of the switch units 3 and 9 is performed such that the video signal fed from the component input terminal IN2 is output from the component output terminal OUT2 through the VSP 5. Referring to FIG. 8, the video decoder 4 is selected as the input source to the VSP 5, and the video encoder 8 is selected as the output destination from the VSP 5. As a result, the automatic setting is made such that the VSP 5 performs the image processing to the video signal fed from the DVD player 50A into the component input terminal IN2, and such that the video signal is output from the component output terminal OUT2. Accordingly, after the image processing is performed to the video signal fed into the component input terminal IN2, the video signal can be output to the display device 60B and displayed on the display device 60B.

Because the video input and output pathway is changed from "HDMI input terminal IN1-VSP 5-HDMI output terminal OUT1" to "analog video input terminal IN2-VSP 5-analog video output terminal OUT2", generally the RX 2 is put into the power-off state, the process of the RX 2 is not performed at all, and the switch unit 13 selects the audio input terminal IN5. Therefore, the audio processing unit 7 amplifies the audio signal fed into the audio input terminal IN5, and the audio processing unit 7 outputs the amplified audio signal to the speaker 70. As a result, the audio data included in the HDMI data cannot be reproduced. When the DVD player 50A is not connected to the audio input terminal IN5, the audio cannot be reproduced. On the contrary, in the present invention, when the video input and output pathway is changed from "HDMI input terminal IN1-VSP 5-HDMI output terminal OUT1" to "analog video input terminal IN2-VSP 5-analog video output terminal OUT2", the control unit 10 determines whether the HDMI data is fed into the HDMI input terminal IN1. When the HDMI data is fed into the HDMI input terminal IN1, the RX 2 is not put into the power-off state, and the control unit 10 causes the RX 2 to produce only the audio data from the HDMI data. Accordingly, the RX 2 produces the audio data from the HDMI data, and the RX 2 supplies the audio data to the audio processing unit 7 through the switch unit 13, so that the audio data included in the HDMI data can be amplified to supply the audio data to the speaker.

As described above, when the display device 60A connected to the HDMI output terminal OUT1 cannot receive the HDMI data, the audio data included in the HDMI data can be reproduced even if the video input and output pathway is set such that the video signal inputted from the component input terminal IN2 is output from the component output terminal OUT2 through the VSP 5.

(Case 2)

Figure 1B:
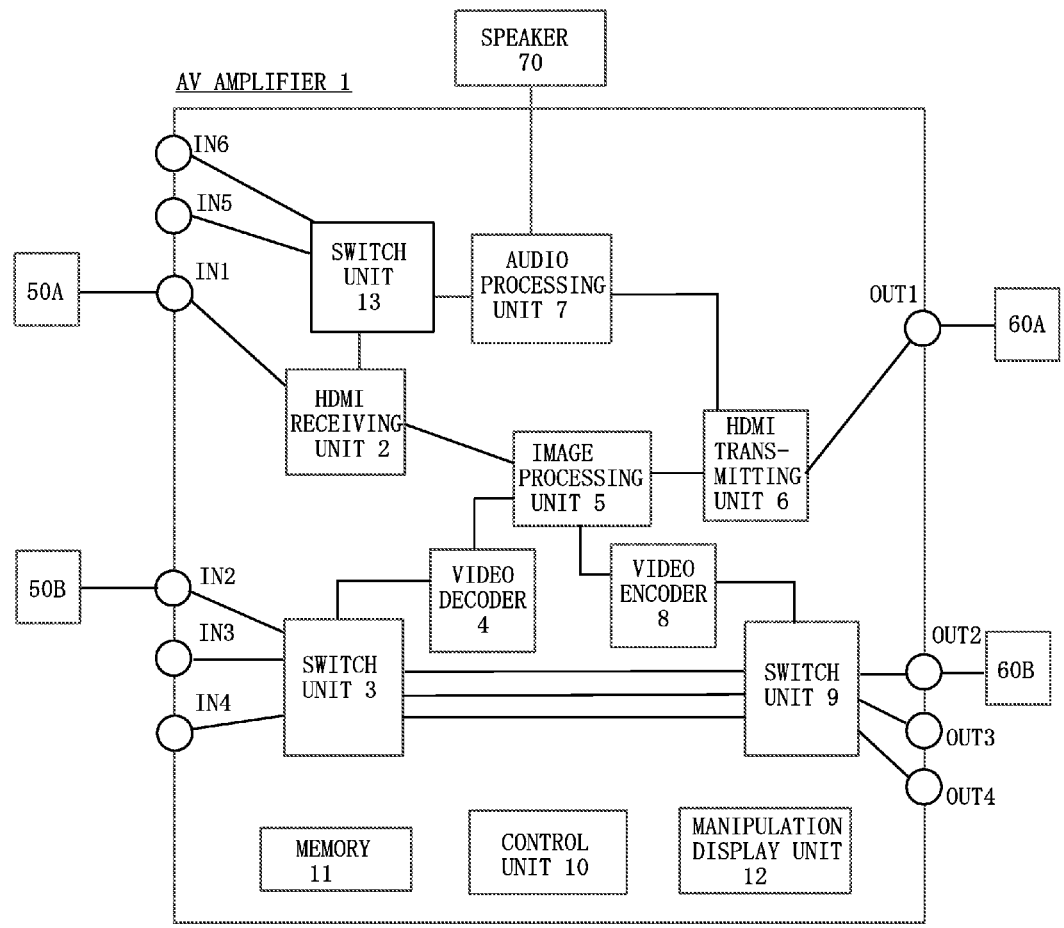
FIG. 1B is a block diagram illustrating the AV amplifier 1 according to the present invention.

As illustrated in FIG. 1B, the DVD player 50A is connected to the HDMI input terminal IN1. Because the DVD player 50A reproduces the music CD, the HDMI data that includes only the audio data is fed into the HDMI input terminal IN1. The DVD player 50B is connected to the component input terminal IN2, and the video signal is fed into the component input terminal IN2. The display device 60A is connected to the HDMI output terminal OUT1, and the display device 60B is connected to the component output terminal OUT2. The display device 60A is put into the power-on state, and the display device 60B is put into the power-off state. At this point, the HDMI data fed from the DVD player 50A into the HDMI input terminal IN1 is supplied to the RX 2. The RX 2 produces the audio data from the HDMI data to supply the audio data to the audio processing unit 7 through the switch unit 13. The audio processing unit 7 amplifies the audio data to output the audio data to the speaker 70, thereby reproducing the audio.

At this point, the display device 60A is put into the power-off state, and the display device 60B is put into the power-on state. As with the Case 1, the automatic setting is made such that the VSP 5 performs the image processing to the video signal fed from the DVD player 50B into the component input terminal IN2, and such that the video signal is output from the component output terminal OUT2. Accordingly, after the image processing is performed to the video signal fed into the component input terminal IN2, the video signal can be output to the display device 60B and displayed on the display device 60B.

At this point, when the video input and output pathway is changed from "HDMI input terminal IN1-VSP 5-HDMI output terminal OUT1" to "analog video input terminal IN2-VSP 5-analog video output terminal OUT2", the RX 2 is generally put into the power-off state, the process of the RX 2 is not performed at all, and the switch unit 13 selects one of the audio input terminal IN5 and IN6. As a result, the audio data included in the HDMI data cannot be reproduced. On the contrary, in the present invention, when the video input and output pathway is changed from "HDMI input terminal IN1-VSP 5-HDMI output terminal OUT1" to "analog video input terminal IN2-VSP 5-analog video output terminal OUT2", the control unit 10 determines whether the HDMI data is fed into the HDMI input terminal IN1. When the HDMI data is fed into the HDMI input terminal IN1, the RX 2 is not put into the power-off state, and the control unit 10 causes the RX 2 to produce only the audio data from the HDMI data. Accordingly, the RX 2 produces the audio data from the HDMI data, and the RX 2 supplies the audio data to the audio processing unit 7 through the switch unit 13, so that the audio data (audio data of music CD) included in the HDMI data can be reproduced.

As described above, when the display device 60A connected to the HDMI output terminal OUT1 cannot receive the HDMI data, the audio data included in the HDMI data can be reproduced even if the video input and output pathway is set such that the video signal inputted from the component input terminal 1N2 is output from the component output terminal OUT2 through the VSP 5.

Alternatively, in the process of FIG. 6, the video input and output pathway may be set to "analog video input terminal—analog video output terminal" in S509, the video input and output pathway may be set to "analog video input terminal—HDMI output terminal" in S511, and the video input and output pathway may be set to "HDMI input terminal—HDMI output terminal" in S512. Alternatively, in the process of FIG. 10, the control unit may determine whether the video input and output pathway is "analog video input terminal—analog video output terminal" in S901, and the control unit may determine whether the video input and output pathway is "HDMI input terminal—HDMI output terminal" in S905.

Although the preferred embodiments of the present invention are described above, the present invention is not limited thereto. The present invention may be provided in the form of a program for causing a computer to perform the above-described operation of the AV amplifier and a recording medium in which the program is stored.

What is claimed is:

1. A video and audio processing device comprising:
    at least one specific-standard digital input terminal into which specific-standard digital data including video data and audio data is fed;
    at least one analog video input terminal into which an analog video signal is fed;
    at least one specific-standard digital output terminal from which the specific-standard digital data is output;
    at least one analog video output terminal from which the analog video signal is output;
    a receiving unit that receives the specific-standard digital data fed into the specific-standard digital input terminal and produces video data and/or audio data from the specific-standard digital data;
    a switching unit that switches a video input and output pathway at least between "analog video input terminal—analog video output terminal" and "specific-standard digital input terminal—specific-standard digital output terminal";
    an input determining unit that determines whether the specific-standard digital data is fed into the specific-standard digital input terminal; and a pathway determining unit that determines whether the video input and output pathway is "analog video input terminal—analog video output terminal", wherein the receiving unit produces only the audio data from the specific-standard digital data, when the specific-standard digital data is fed into the specific-standard digital input terminal while the video input and output pathway is "analog video input terminal—analog video output terminal".

2. A video and audio processing device comprising:

at least one specific-standard digital input terminal into which specific-standard digital data including video data and audio data is fed;

at least one analog video input terminal into which an analog video signal is fed;

at least one specific-standard digital output terminal from which the specific-standard digital data is output;

at least one analog video output terminal from which the analog video signal is output;

a receiving unit that receives the specific-standard digital data fed into the specific-standard digital input terminal and produces video data and/or audio data from the specific-standard digital data;

an image processing unit that performs image processing to the video data;

a switching unit that switches a video input and output pathway at least between "analog video input terminal—image processing unit—analog video output terminal" and "specific-standard digital input terminal—image processing unit-specific-standard digital output terminal";

an input determining unit that determines whether the specific-standard digital data is fed into the specific-standard digital input terminal; and a pathway determining unit that determines whether the video input and output pathway is "analog video input terminal—image processing unit—analog video output terminal", wherein the receiving unit produces only the audio data from the specific-standard digital data, when the specific-standard digital data is fed into the specific-standard digital input terminal while the video input and output pathway is "analog video input terminal—image processing unit—analog video output terminal".

3. The video and audio processing device according to claim 2, wherein the receiving unit is put into a power-off state, when the specific-standard digital data is not fed into the specific-standard digital input terminal while the video input and output pathway is "analog video input terminal—image processing unit—analog video output terminal".

4. The video and audio processing device according to claim 2, wherein the switching unit is also capable of switching the video input and output pathway to "analog video input terminal—image processing unit—specific-standard digital output terminal", and the receiving unit is put into a power-off state when the video input and output pathway is "analog video input terminal—image processing unit—specific-standard digital output terminal".

5. The video and audio processing device according to claim 1, further comprising a state determining unit that determines whether a device connected to the specific-standard digital output terminal is capable of receiving the specific-standard digital data, wherein the switching unit switches a video output destination to the specific-standard digital output terminal when the device connected to the specific-standard digital output terminal is capable of receiving the specific-standard digital data, and the switching unit switches the video output destination to the analog video output terminal when the device connected to the specific-standard digital output terminal is not capable of receiving the specific-standard digital data.

6. The video and audio processing device according to claim 2, further comprising a state determining unit that determines whether a device connected to the specific-standard digital output terminal is capable of receiving the specific-standard digital data, wherein the switching unit switches a video output destination to the specific-standard digital output terminal when the device connected to the specific-standard digital output terminal is capable of receiving the specific-standard digital data, and the switching unit switches the video output destination to the analog video output terminal when the device connected to the specific-standard digital output terminal is not capable of receiving the specific-standard digital data.

7. A non-transitory machine-readable medium having stored therein a video and audio processing program for a video and audio processing device comprising: at least one specific-standard digital input terminal into which specific-standard digital data including video data and audio data is fed; at least one analog video input terminal into which an analog video signal is fed; at least one specific-standard digital output terminal from which the specific-standard digital data is output; at least one analog video output terminal from which the analog video signal is output; a receiving unit that receives the specific-standard digital data fed into the specific-standard digital input terminal and produces video data and/or audio data from the specific-standard digital data; a switching unit that switches a video input and output pathway at least between "analog video input terminal—analog video output terminal" and "specific-standard digital input terminal—specific-standard digital output terminal"; the video and audio processing program causing a computer to perform the steps of:

determining whether the specific-standard digital data is fed into the specific-standard digital input terminal;

determining whether the video input and output pathway is "analog video input terminal—analog video output terminal", and causing the receiving unit to produce only the audio data from the specific-standard digital data, when the specific-standard digital data is fed into the specific-standard digital input terminal while the video input and output pathway is "analog video input terminal—analog video output terminal".

8. A non-transitory machine-readable medium having stored therein a video and audio processing program for a video and audio processing device comprising: at least one specific-standard digital input terminal into which specific-standard digital data including video data and audio data is fed; at least one analog video input terminal into which an analog video signal is fed; at least one specific-standard digital output terminal from which the specific-standard digital data is output; at least one analog video output terminal from which the analog video signal is output; a receiving unit that receives the specific-standard digital data fed into the specific-standard digital input terminal and produces video data and/or audio data from the specific-standard digital data; an image processing unit that performs image processing to the video data; a switching unit that switches a video input and output pathway at least between "analog video input terminal—image processing unit—analog video output terminal" and "specific-standard digital input terminal—image processing unit—specific-standard digital output terminal"; the video and audio processing program causing a computer to perform the steps of:

determining whether the specific-standard digital data is fed into the specific-standard digital input terminal;

determining whether the video input and output pathway is "analog video input terminal—image processing unit—analog video output terminal", and causing the receiving unit to produce only the audio data from the specific-standard digital data, when the specific-standard digital data is fed into the specific-standard digital input terminal while the video input and output pathway is "analog video input terminal—image processing unit—analog video output terminal".

* * * * *